Patented Oct. 16, 1923.

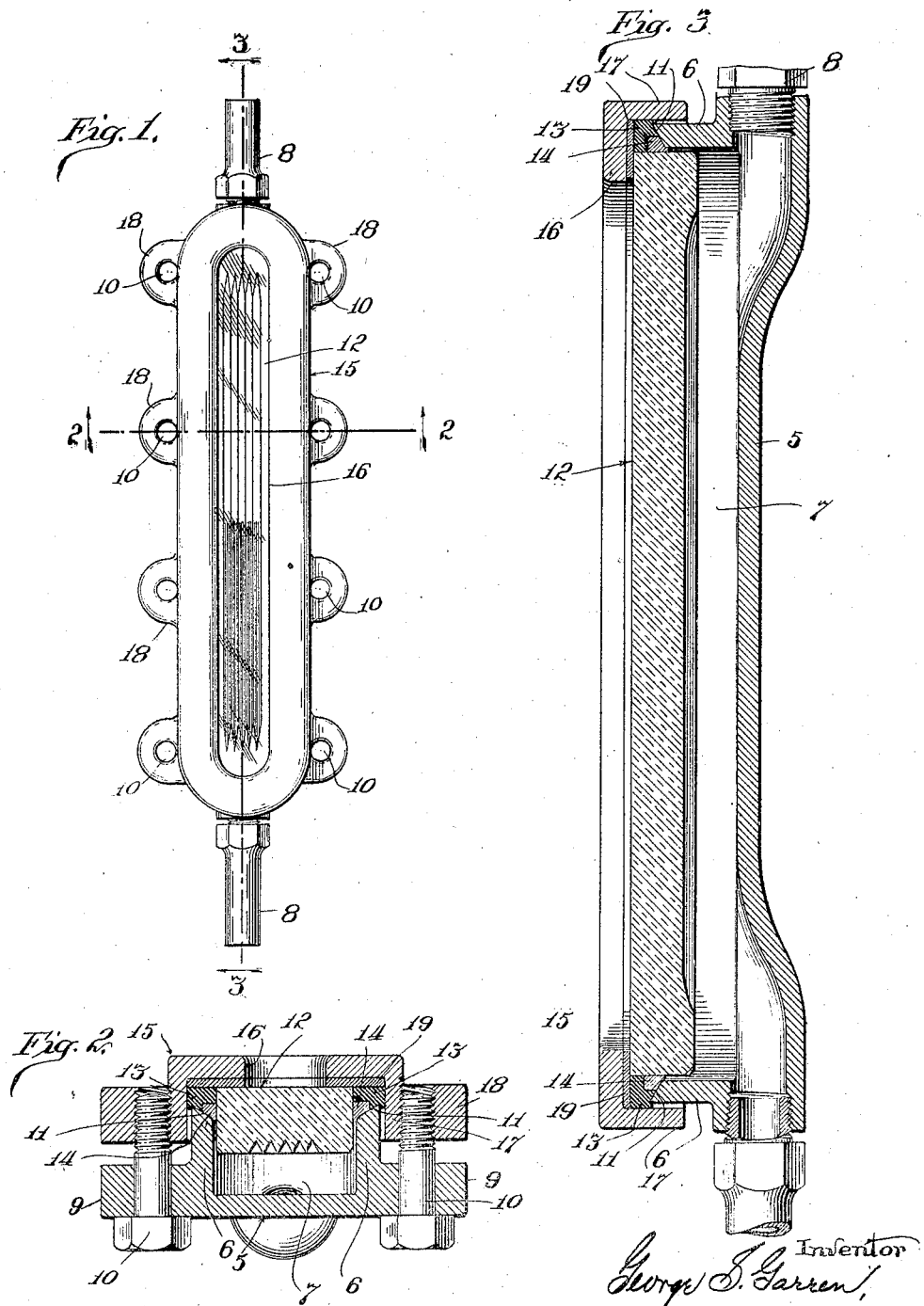

1,470,720

UNITED STATES PATENT OFFICE.

GEORGE S. GARREN, OF OAK PARK, ILLINOIS, ASSIGNOR TO SARGENT COMPANY, OF CHICAGO, ILLINOIS, A CORPORATION OF ILLINOIS.

WATER GAUGE.

Application filed August 9, 1920. Serial No. 402,362.

*To all whom it may concern:*

Be it known that I, GEORGE S. GARREN, a citizen of the United States, and a resident of Oak Park, in the county of Cook and State of Illinois, have invented certain new and useful Improvements in Water Gauges, of which the following is a description, reference being had to the accompanying drawing, which forms a part of my specification.

My invention relates to improvements in water gauges employed in connection with steam boilers and the like for the purpose of indicating the fluid level, under pressure, in the containers; the invention pertaining to that type of water gauge wherein a metallic shell or casing is formed to provide a water-receiving chamber in conjunction with a sight glass which is adapted to constitute one wall of the chamber, the glass or transparent wall being removably secured in place by means of a suitable gasket or resilient packing and a metallic cover member which is adapted to be removably bolted or secured to the main member or metallic shell or casing of the gauge.

The invention more specifically stated contemplates a construction wherein such relation between the main shell or casing, the transparent wall or sight glass and the metallic cover plate may be effected that fluid-tight joints may be provided by means of a specific type of gasket or packing element wherein a heat-resisting surface will be presented at points where the hot water and steam is likely to have contact with the gasket or packing element; while at the same time a construction is provided wherein undue strains and stresses can not be applied to the transparent wall or sight glass in securing the respective elements together, as has, however, been the case in water gauges of this type as heretofore employed.

In water gauges of the character to which my invention relates it has heretofore been the practice to provide a water and steam joint between the metallic members and the sight glass by means of a flat gasket disposed along the flat sides or surfaces of the glass adjacent the edges thereof, while the main shell or casing and the cover member were so constructed that pressure on the inner and outer flat surfaces or sides of the sight glass was applied when securing the parts firmly together for the purpose of providing a steam-tight connection. Such practice necessarily places the sight glass under an initial strain, especially where the fastening elements or bolts are not uniformly operated in pressure-applying direction. The strains or stresses thus applied to the sight glass, and especially where a slight distortion of the metallic portion of the gauge exists, not only results in an unequal distribution of the strain on the glass, but also results in a deficient gauge which, by reason of the high and low areas, that is to say, of uneven compression of the gasket, permits leakage.

The object of my invention is to provide a gauge wherein the clamping pressure resulting from securing the cover member to the main or body member will merely be applied to the gasket or packing and in such manner as to cause it to have firmer contact and therefore fluid-tight relation with the edges of the sight glass, with the result that the glass will not be subjected to the initial strains above referred to. With my improved gauge, the pressure is applied to the packing or gasket element in such manner that it will be forced against the edges of the glass by reason of the elasticity of the packing or gasket enables it to adjust itself to any deflection or irregularities so as to positively contain the pressure; the portion of the gasket or packing which may have contact with the hot water and steam being of such nature as to be able to resist the heat of the fluid and therefore also to prevent flow of the rubber which constitutes the major portion of the packing or gasket element, with the result that diminution of the cubical content of the gasket will be prevented.

The above enumerated objects and advantages of my invention, as well as other advantages inherent in the construction, will be more fully comprehended from the detailed description of the accompanying drawing, wherein:—

Figure 1 is a front side elevation of my improved water gauge.

Figure 2 is a cross sectional view, taken on the line 2—2 of Figure 1 looking in the direction of the arrows.

Figure 3 is a longitudinal sectional view taken on the line 3—3 of Figure 1, looking in the direction of the arrows.

My invention as disclosed in the drawing comprises the main body portion 5 of suitable metal provided with the sides or flange portions 6 of suitable dimensions to provide a water space or chamber 7 within the main shell or casing 5. The opposite ends of the main shell or casing 5 are provided with apertured bosses adapted to receive tubular extensions or connections 8, 8 whereby proper connection with the boiler may be effected to determine the water level in the container or boiler. The main portion or shell 5 is provided with lateral extensions or lobes, as at 9, on both sides thereof, provided with suitable apertures to receive screw-bolts 10. The side or flange portion 6 of the main member or casing 5 extends entirely about the member and therefore about chamber 7 and has the edge thereof beveled as shown at 11 in Figure 2. The side or flange portion 6 is not only of depth sufficient to provide a suitable fluid chamber 7, but is also adapted to receive a portion of the sight glass 12 therebetween as shown in Figure 2. The sight glass 12 is inserted only partially into the space within the side or flange portion 6 and is held in proper relation with the main shell or casing by a suitable packing element or gasket 13 which is formed to extend entirely about the narrow sides or edge of the glass, that is to say at both sides and both ends thereof, so as to not only snugly engage with the sides of the glass but also to form contact with and be seated on the beveled edge of the side or flange portion 6 of the casing member 5. The packing element 13 is preferably mainly composed of rubber, while the inner perimeter thereof and the side disposed toward the portion 6 and therefore toward the fluid chamber 7 is preferably composed of fabric asbestos, as shown at 14. With this construction it is apparent that the rubber will not be directly exposed to the hot water or steam which may find passage intermediate of the glass and the side or flange portion 6 of the casing 5, where rubber would be apt to be affected by the heat and caused to flow; such action not only minimizing its holding relation with the glass and flange portion of the casing but also producing a loss or diminution of the cubical content of the packing.

The sight glass 12 surrounded by the packing element 13 having been inserted into place as just described, cover member 15 is then placed over the outer surface or side of the sight glass and the packing element; the cover member 15 being provided with a sight opening as at 16, of less dimensions than the width and length of the sight glass 12, in order that the cover member may partially overlap the outer face of the glass as shown in Figure 2. The cover member 15 is formed with side portions 17 which are adapted to overlap or partially telescope with the sides or flange portion 6 of the main member 5 of the casing, that is to say, the size of the cover member 15 is such that its sides will extend to the outside of the flange portion or sides 6 of the main member 5. The side portions 17 of the cover member 15 have lateral extensions or lobes as at 18, which are provided with tapped apertures adapted to receive the threaded portions of the screw-bolts 10.

In order to obviate direct contact between the cover member 15 and the sight glass 12, I prefer to provide a thin gasket or cushion strip as at 19.

It is evident that with my improved construction, the screwing or fastening together of the casing members 5 and 15 will not subject the sight glass to pressure on the opposite flat surfaces thereof; while the beveled sides or flange portion 6, disposed entirely about the sight glass and formed integral with the main portion 5 of the casing will force the packing into snug relation with the edges or narrow sides of the sight glass; the tightening of the screw bolts 10 inducing the gland forming portion 6 of the main member 5 to force the packing element inwardly toward the edge of the sight glass, so that the sight glass is held in position relative to member 5 and chamber 7, merely by the pressure of the gasket or packing element against the sides or edges of the glass. It is apparent, therefore, that the sight glass in my improved construction is merely subjected to the boiler pressure or pressure within the gauge; so that pressure will be equally distributed on the entire inner face of the glass. With my improved construction, in the event of any leaks occurring, tightening of the respective screw-bolts can not apply undue strains to the sight glass and therefore any irregularities in the screwing up of the bolts will in no way affect or cause improper strains on the glass, as the compression strains and any strains resulting from deflection or distortion in the metal parts will be taken care of by the packing element or gasket 13 without transmitting them to the sight glass.

Difficulty has been encountered with water gauges of this general character due to the action of the steam and water on the rubber packing or gasket and uneven pressure so that steam is allowed to seep through or escape in minute quantities. It has been found in practice that the minutest escape of steam about the sides of the sight glass quickly results in erosion of the glass with the result that it is impossible subsequently, even with a new packing or gasket, to provide a fluid-tight connection; while the sight glass by reason of such erosion on its outer face becomes unserviceable, although the inner and reflex surface thereof is still practically unworn, with the result that undue loss and expense is encountered.

It is apparent from my construction that at no time is it possible to place the sight glass under compression strains through the clamping or fastening together of the metallic members, because the entire inner face of the sight glass in no way contacts with or is opposed by the metal portions of the gauge; the glass being merely subject to the boiler pressure, while any tightening of the screw-bolts merely results in a further compression of the packing element, which, by reason of the formation of the gland forming sides of the main member 5 of the casing, is wedged toward and into firmer relation with the edges of the sight glass.

While I believe the construction shown and described to be the best adaptation of the invention, it will be understood that certain details may be varied without, however, departing from the spirit of the invention.

What I claim and wish to secure by Letters Patent is:—

A water gauge of the character described, comprising a body member formed to provide an open sided water and steam chamber, said member being provided with a continuous extended margin or flange having inwardly beveled edges to constitute a gland portion, a sight glass disposed partially in said member within said continuous flange, a composite packing element provided with an asbestos portion on the surface disposed toward said gland and said glass, said packing element being disposed about the edges of the sight glass to maintain the position of the glass relative to said chamber, a cover member provided with a sight opening and adapted to overlap the outer face of the sight glass, said cover member being provided with off-set edges adapted to telescope with the gland portion of the body member, the body member and cover member being provided with laterally disposed correlated portions, and fastening means engaging with said laterally disposed portions whereby the body member and cover member are adjustably secured together, the packing element thereby compressed between said gland portion and the cover member and forced toward the edges of the sight glass.

GEORGE S. GARREN.

Witnesses:
MARION GARREN,
LOUIS L. SMOLINSKI.